W. GRIES.
SAFETY GUARD FOR BOLTS AND THE LIKE.
APPLICATION FILED MAR. 6, 1917.
1,303,293.
Patented May 13, 1919.
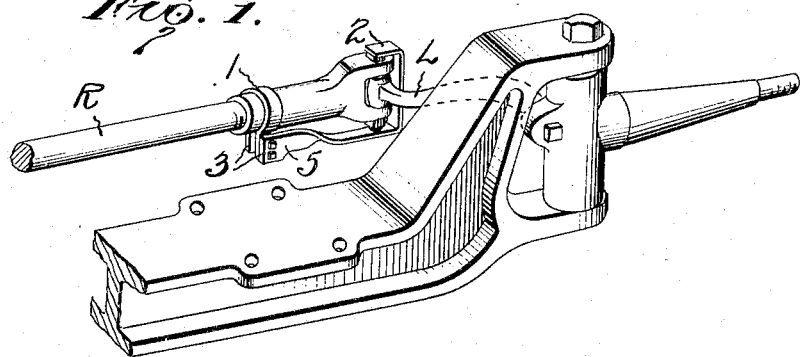
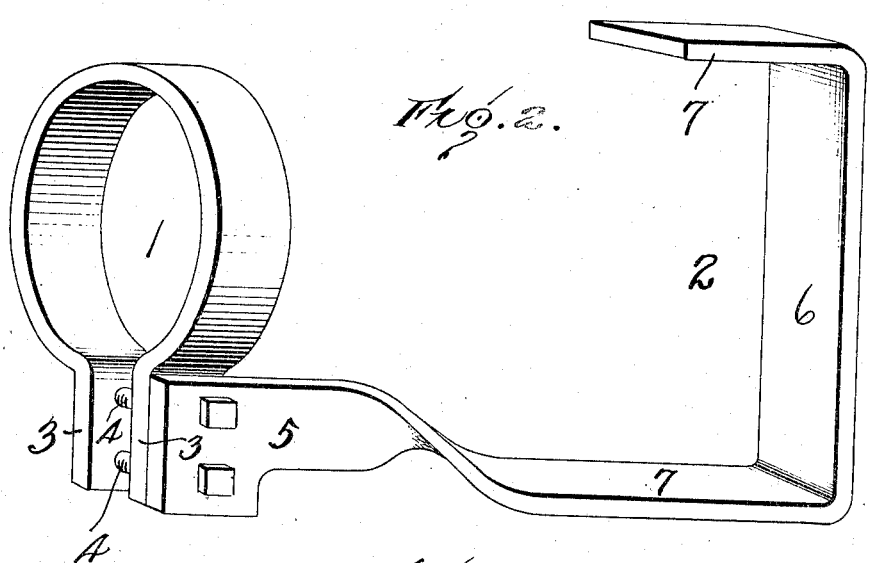
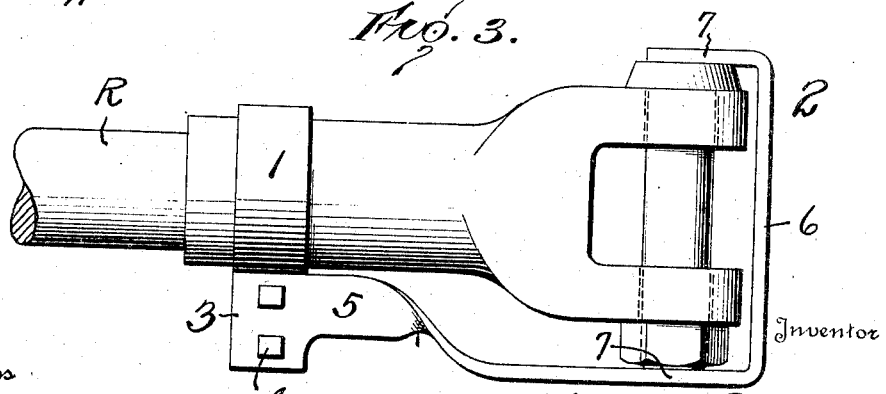
Witness
E. L. Hoff
Inventor
WILLIAM GRIES
By
Attorney

UNITED STATES PATENT OFFICE.

WILLIAM GRIES, OF NEWARK, NEW JERSEY.

SAFETY-GUARD FOR BOLTS AND THE LIKE.

1,303,293.  Specification of Letters Patent.  Patented May 13, 1919.

Application filed March 6, 1917. Serial No. 152,850.

*To all whom it may concern:*

Be it known that I, WILLIAM GRIES, a citizen of the United States, residing at Newark, in the county of Essex and State of New Jersey, have invented certain new and useful Improvements in Safety-Guards for Bolts and the like, of which the following is a specification.

This invention relates to a novel safety device possessing practical utility in its application to bolted joints or connections to effectually prevent the disengagement and loss of the bolt, and is more particularly available for use in connection with the bolted joints of motor vehicle steering gear.

To this end the invention contemplates a simple and practical device in the form of a guard clamp which may be readily applied to a bolted joint in such a manner as to prevent the bolt from being lost in case the nut thereon works loose. Under such conditions the bolt is frequently jarred entirely out of place with the result that the steering gear is disconnected and the driver loses control of the vehicle, thereby creating an exceedingly dangerous condition. With a view of entirely obviating this possibility, the present invention provides a safety guard which may be readily and firmly clamped in such a position as to positively hold the bolt in its proper place regardless of the presence or absence of the nut, while at the same time not interfering at all with the free relative movement of all parts of the steering gear, and preventing the working of the parts due to vibration so that the nut is not loosened.

A further object of the invention is to provide a device which is substantial and reliable in action, and which is relatively inexpensive to manufacture, and easily and quickly installed, and which after being applied requires little or no manual attention.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which—

Figure 1 is a perspective view of a portion of a vehicle steering gear showing the application of my invention.

Fig. 2 is a perspective view of the invention removed from the steering gear.

Fig. 3 is a side elevation of a portion of a steering gear joint showing the clamp applied thereto.

Similar references designate corresponding parts throughout the several figures of the drawings.

In carrying out the invention, it is proposed to make the several parts thereof as simple and few in number as possible, and to this end the device includes in its organization an attaching bracket 1 and a clamping guard body 2 which are detachably connected, as will hereinafter more fully appear, to facilitate the application of the device.

As will be observed from Fig. 1 of the drawing, illustrating the device applied to the steering gear of a motor vehicle, the attaching bracket 1 is preferably secured to the steering cross rod R, and holds the guard body 2 in operative position over the bolt, which connects the cross rod and link L. That is to say, the attaching bracket 1 is preferably in the form of a circular clamp for embracing the cross rod of the steering gear, and has relatively free depending bolting arms 3 provided with suitable openings to receive the securing bolts 4, which also serve to clamp at one side of one of the arms 3 the attaching end portion 5 of the guard member 2. The clamping of the attaching end portion 5 of the guard member to the depending arms of the attaching bracket thus places the said arms under a tension that is sufficient to keep the nuts on the bolts 4 tight in the same manner that would be accomplished by the use of a lock washer.

Referring now more particularly to the guard body element 2, it will be observed that the same is of angular formation, and includes the body portion or web 6, and the angularly disposed bolt engaging portions 7. The entire guard body is preferably made of metal possessing sufficient resiliency to yieldingly engage both ends of the bolt, to thereby prevent any vertical movement of the same in the joint, and because of the connection of the attaching end 5 of the guard body with the arm of the attaching bracket 1, it will be clear that the entire guard body is firmly held in place and prevented from lateral or longitudinal movement, to thereby securely hold the bolt.

Owing to the relatively narrow width of the entire guard portion 2 of the device, and its location at the end of the rod 2, it will be apparent that the relative swinging movement between the link L and the rod R will not in any way be hindered, but the bolt will be securely held in place and prevented from jumping out, thereby minimizing the possibility of disastrous results.

Without further description, it is thought that the many features and advantages of the invention will be apparent, and it will, of course, be understood that changes in the form, proportion and minor details of construction may be resorted to without departing from the spirit of the invention or the scope of the appended claims.

I claim:

1. A safety guard for bolted joints and the like comprising an attaching bracket adapted to be supported from a member of the joint, and a guard element of angular formation to embrace the joint and overlie both ends of the bolt, said guard element being carried by the bracket.

2. A safety clamp of the class described including a guard element comprising a body having offset abutment members providing a clearance space therebetween, one of said members being extended to provide an attaching portion, and an attaching bracket for said guard member.

3. A safety clamp of the class described including an attaching bracket having a circular clamp portion and depending bolting arms, and a guard element including a body having spaced offset portions, and also having an attaching extension, and bolts for connecting the attaching section of the guard element to the attaching bracket.

4. A safety guard for bolted joints and the like, comprising a guard element having a member embracing the joint and overlying both ends of the bolt, and attaching means for supporting the guard element.

In testimony whereof I hereunto affix my signature in the presence of two witnesses.

WILLIAM GRIES.

Witnesses:
ERNEST M. TAPNER,
ROBERT F. BROWNE.